Patented Oct. 31, 1939

2,178,454

UNITED STATES PATENT OFFICE 2,178,454

PRODUCTION OF OLEFIN OXIDES

Karl Metzger, Ludwigshafen-on-the-Rhine, and Leonid Andrussow, Mannheim, Germany, assignors to I. G. Farbenindustrie Aktiengesellschaft, Frankfort-on-the-Main, Germany No Drawing. Application November 3, 1938, Serial No. 238,639. In Germany November 18, 1937

7 Claims. (Cl. 260—348)

The present invention relates to the production of olefin oxides by catalytic oxidation of olefins, in particular low molecular olefins.

It has already been proposed to prepare olefin oxides by treating olefins with oxygen or gases containing oxygen at elevated temperatures in the presence of catalysts comprising silver activated by the addition of various other metals, such as copper or gold.

We have now found that olefin oxides are obtained in better yields than hitherto by carrying out the oxidation of the olefins in the presence of silver catalysts which contain metals of the platinum group as activators. In addition to the metals of the platinum group, the silver catalysts may also contain other metals or metal compounds already proposed as promoters of the activity of the silver catalysts, such as copper or gold, iron, manganese, nickel, cobalt, cerium, thorium and zinc.

The preparation of such catalysts may be carried out in various ways, for example by decomposing organic compounds, or other compounds unstable when heated, of the catalyst metals, in particular by heating such compounds in the presence of a liquid of high boiling point. The silver catalysts may also be obtained by precipitating the silver and the metals of the platinum group from solutions of silver salts and the metal salts in the presence of reducing agents.

The reaction conditions for the preparation of olefin oxides, in particular of ethylene oxide with the new catalysts may be the same as those used in the processes hitherto known for the catalytic preparation of olefin oxides from olefins. The most suitable temperatures usually lie between 150° and 500° C., usually above 200° C. The temperature should not exceed the point at which pyrolytic side-reactions are substantially favored. In many cases it is preferable to work under pressure, as for example at 5 or 20 atmospheres or more. The oxidation of the olefins may be carried out in the presence of diluent gases, as for example carbon dioxide, nitrogen or steam, but the new catalysts offer the advantage that good yields of olefin oxides are also obtained without the addition of steam. The oxidation may be carried out in a cyclic process, by returning the unconverted olefin again to the conversion after separating the alkylene oxide formed and the by-products formed.

The new catalysts are distinguished from those already known in that they give a uniform yield of olefin oxides and have a longer working life.

The following examples will further illustrate how the said invention may be carried out in practice, but the invention is not restricted to these examples. The parts are by weight unless otherwise stated.

Example 1

In order to prepare the catalyst, a solution of 100 parts of silver nitrate in 300 parts of water and a solution of 1 part of chlorplatinic acid in 20 parts of water are allowed to drop into a solution of 42 parts of ammonium oxalate and 0.25 part of potassium hydroxide in 2000 parts of water while stirring. The precipitate formed is filtered off, boiled for ¼ hour in glycol, filtered off, washed with water and dried at 450° C. in a current of oxygen.

Over 2 parts by volume of the catalyst thus prepared there is led per hour at from 300° to 320° C. a mixture of 500 parts by volume of ethylene, 500 parts by volume of air and 1000 parts by volume of steam. The reaction gases contain ethylene oxide in a yield of from 70 to 80 per cent with reference to the amount of ethylene converted.

If a mixture of 2500 parts by volume of ethylene and 2500 parts by volume of air be led over 1 part by volume of the catalyst per hour, there is obtained a reaction gas in which 93 per cent of the reacted ethylene are present as ethylene oxide.

Example 2

For the preparation of the catalyst, 10 parts of silver nitrate, 10 parts of 30 per cent nitric acid and 20 parts of 5 per cent alcoholic hydrazine hydrate solution are dissolved in 300 parts of water. This solution is added while stirring to a solution of 42 parts of ammonium oxalate, 2 parts of palladous chloride and 60 parts of 10 per cent ammonia solution in 1000 parts of water. The resulting precipitate is filtered off, boiled for ¼ hour in glycol, filtered, washed with water and dried at 400° C. in a current of air.

Over 2 parts by volume of the catalyst thus prepared there is led at 350° C. a mixture of 500 parts by volume of air and 500 parts by volume of ethylene. The reaction gas contains 75 per cent of the reacted ethylene as ethylene oxide.

What we claim is:

1. In the production of olefin oxides by catalytic oxidation of low molecular olefins the step which comprises reacting a low molecular olefin with oxygen in the presence of a catalyst comprising silver activated by a metal selected from the group consisting of platinum and palladium at a temperature between 150° and 500° C.

2. In the production of ethylene oxide by catalytic oxidation of ethylene the step which comprises reacting ethylene with oxygen in the presence of a catalyst comprising silver activated by a metal selected from the group consisting of platinum and palladium at temperatures exceeding 200° C. but below the temperature at which pyrolytic side-reactions are substantially favored.

3. In the production of ethylene oxide by catalytic oxidation of ethylene the step which comprises reacting ethylene with oxygen in the presence of an inert gas and in the presence of a catalyst comprising silver activated by a metal selected from the group consisting of platinum and palladium at temperatures exceeding 200° C. but below the temperature at which pyrolytic side-reactions are substantially favored.

4. In the production of ethylene oxide by catalytic oxidation of ethylene the step, which comprises reacting ethylene with oxygen in the presence of steam and in the presence of a catalyst comprising silver activated by a metal selected from the group consisting of platinum and palladium at temperatures exceeding 200° C. but below the temperature at which pyrolytic side-reactions are substantially favored.

5. In the production of ethylene oxide by catalytic oxidation of ethylene the step which comprises reacting ethylene with air in the presence of steam and in the presence of a catalyst comprising silver activated by a metal selected from the group consisting of platinum and palladium at temperatures exceeding 200° C. but below the temperature at which pyrolytic side-reactions are substantialy favored.

6. In the production of ethylene oxide by catalytic oxidation of ethylene the step which comprises reacting ethylene with oxygen in the presence of an inert gas and in the presence of silver activated by platinum at temperatures exceeding 200° C. but below the temperature at which pyrolytic side-reactions are substantially favored.

7. In the production of ethylene oxide by catalytic oxidation of ethylene the step which comprises reacting ethylene with oxygen in the presence of an inert gas and in the presence of silver activated by palladium at temperatures exceeding 200° C. but below the temperature at which pyrolytic side-reactions are substantially favored.

KARL METZGER.
LEONID ANDRUSSOW.